(12) United States Patent
Chmelar

(10) Patent No.: US 11,225,996 B1
(45) Date of Patent: Jan. 18, 2022

(54) DUAL HOOK CLASP

(71) Applicant: Erik Vaclav Chmelar, Midland, MI (US)

(72) Inventor: Erik Vaclav Chmelar, Midland, MI (US)

( * ) Notice: Subject to any disclaimer, the term of this patent is extended or adjusted under 35 U.S.C. 154(b) by 0 days.

(21) Appl. No.: 17/106,096

(22) Filed: Nov. 28, 2020

(51) Int. Cl.
*F16B 45/06* (2006.01)

(52) U.S. Cl.
CPC .................. *F16B 45/06* (2013.01)

(58) Field of Classification Search
CPC .......... B60P 7/0823; F16B 2/10; F16B 45/00; F16B 45/06
See application file for complete search history.

(56) References Cited

U.S. PATENT DOCUMENTS

| | | |
|---|---|---|
| 222,324 A | 12/1879 | Stapleton |
| 294,449 A | 3/1884 | Dat |
| 397,136 A | 2/1889 | McLean |
| 656,923 A | 8/1900 | Beard |
| 682,684 A | 8/1901 | Hakemeyer |
| 712,959 A | 11/1902 | Pohlman |
| 751,614 A * | 2/1904 | Cotten .................... F16G 15/02 59/88 |
| 827,206 A | 7/1906 | Billman |
| 878,274 A | 2/1908 | Clark et al. |
| 931,588 A | 8/1909 | Forstner |
| 955,070 A | 4/1910 | Honabach |
| 1,197,020 A | 9/1916 | Farrar |
| 1,262,974 A | 4/1918 | Pearen |
| 1,512,914 A | 10/1924 | Rees |
| 1,518,541 A * | 12/1924 | Nelson .................... B60C 27/08 24/577.1 |
| 1,584,307 A | 5/1926 | King |
| 1,637,699 A | 8/1927 | Samuel |
| 1,686,424 A | 10/1928 | Malcolm |
| 2,128,804 A | 8/1938 | Donaldson |
| 2,731,695 A | 1/1956 | Valcourt |
| 2,761,190 A | 9/1956 | Saul |
| 2,795,024 A | 6/1957 | Donaldson |
| 2,874,435 A | 2/1959 | Nielsen |
| 3,002,242 A | 10/1961 | Donaldson |
| 3,072,987 A | 1/1963 | Winters |
| 3,128,520 A | 4/1964 | Herman |
| 3,144,748 A * | 8/1964 | Knop ...................... F16G 17/00 59/88 |
| 3,422,964 A | 1/1969 | Nadherny |
| 3,638,283 A | 2/1972 | Moretti |

(Continued)

FOREIGN PATENT DOCUMENTS

| | | |
|---|---|---|
| DE | 3336115 A1 | 4/1985 |
| EP | 2347668 A1 | 7/2011 |
| WO | WO2018125949 A1 | 7/2018 |

*Primary Examiner* — David M Upchurch
(74) *Attorney, Agent, or Firm* — Erik Chmelar

(57) ABSTRACT

A clasp having two opposing parallel hooks coupled together by a pivot joint. The shank of the first hook is disposed above the plane of rotation while the bend of the first hook is disposed below the plane, and the shank of the second hook is disposed below the plane while the bend of the second hook is disposed above the plane. A protrusion on the first shank engages with a depression on the second shank to latch the clasp in a "closed" configuration. The protrusion engages with an edge of the second shank to latch the clasp in a "crossed" configuration.

22 Claims, 11 Drawing Sheets

(56) References Cited

U.S. PATENT DOCUMENTS

| | | | |
|---|---|---|---|
| 3,956,804 | A | 5/1976 | Gatof et al. |
| 3,982,307 | A | 9/1976 | Smith et al. |
| 4,380,101 | A | 4/1983 | Joubert et al. |
| 5,050,273 | A | 9/1991 | Okura |
| 5,317,788 | A | 6/1994 | Esposito et al. |
| 5,956,980 | A | 9/1999 | Jenkins |
| 6,202,267 | B1 | 3/2001 | Collins |
| 6,243,922 | B1 * | 6/2001 | Simon ................... A44B 15/00 24/3.6 |
| 6,460,225 | B1 | 10/2002 | Brault |
| 6,553,636 | B1 * | 4/2003 | Brenner ............... A44C 5/2038 24/334 |
| 6,938,306 | B2 | 9/2005 | Joubert et al. |
| 8,020,337 | B1 * | 9/2011 | Batton ................... A01K 83/02 43/36 |
| 8,099,838 | B2 | 1/2012 | Wang |
| 8,205,306 | B2 * | 6/2012 | Kovach ................ A44B 19/262 24/429 |
| 9,249,825 | B1 | 2/2016 | Cornay |
| 9,333,895 | B2 | 5/2016 | Pingleton |
| 10,731,698 | B2 | 8/2020 | Chmelar |
| 2004/0134118 | A1 | 7/2004 | Miller et al. |
| 2007/0067968 | A1 | 3/2007 | Krawczyk |
| 2009/0119891 | A1 | 5/2009 | Leung |
| 2010/0024177 | A1 * | 2/2010 | Hayes .................... F16B 45/00 24/588.1 |
| 2013/0232733 | A1 | 9/2013 | Jacobson et al. |
| 2014/0053372 | A1 | 4/2014 | Jacobson et al. |
| 2018/0187712 | A1 | 7/2018 | Chmelar |

\* cited by examiner

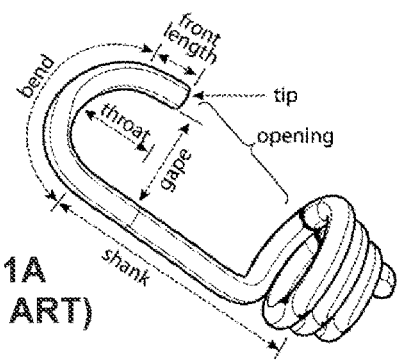
FIG. 1A
(PRIOR ART)
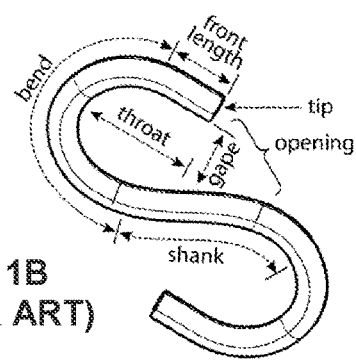
FIG. 1B
(PRIOR ART)
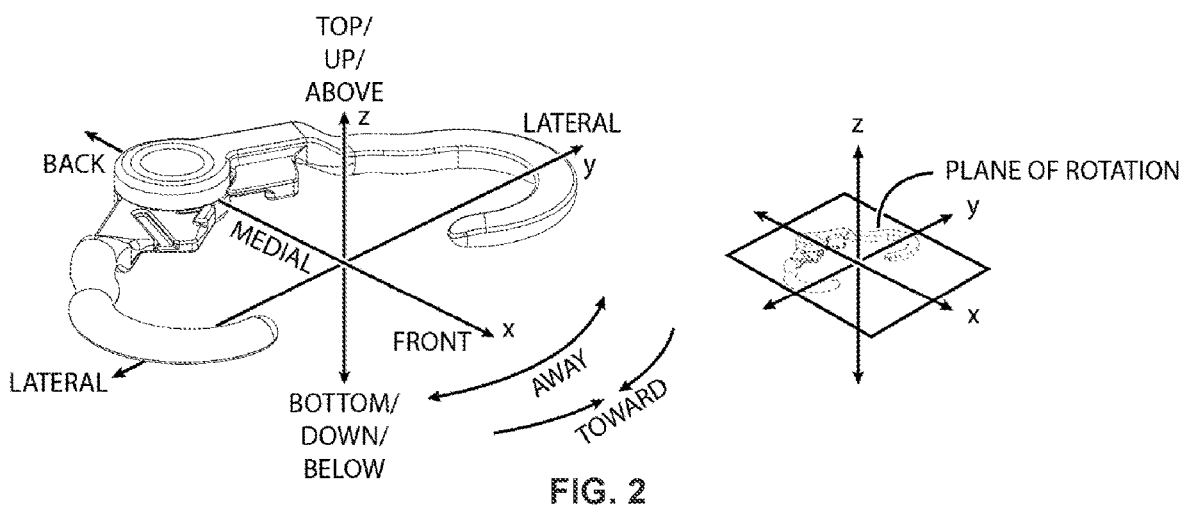
FIG. 2
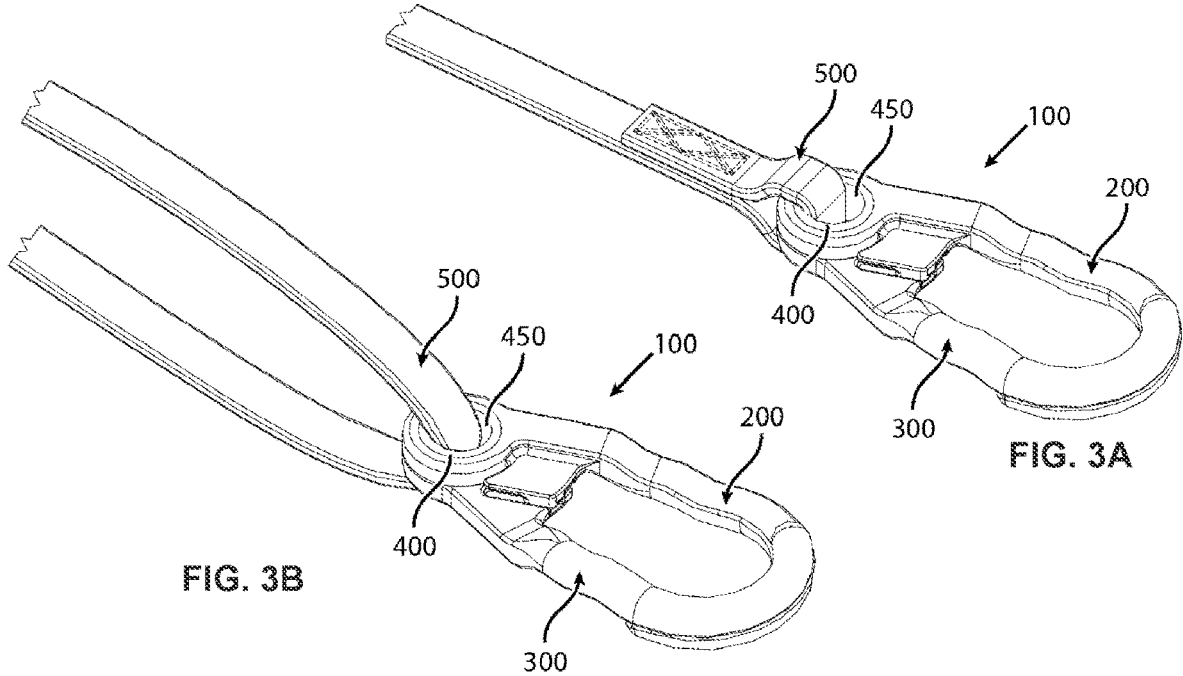
FIG. 3A
FIG. 3B

DUAL HOOK CLASP

BACKGROUND OF THE INVENTION

The present invention relates to hooks that may be attached to cords, ropes, or webbing for tying, bundling, or securing objects. Example applications include bungee cords, tie downs, tarp straps, cargo cords, and stretch cords. Hereafter, the term "tie down" is used generically to refer to any hook-and-cord apparatus having a segment of cord with a rigid hook attached or coupled thereto. The cord may be made of any suitable natural or synthetic materials, and it may be elastic or inelastic. The hook may be made of any suitable natural or synthetic materials, for example metal or plastic. The hook may be manufactured by any suitable method, for example stamping, casting, molding, or milling.

The shank, gape, and throat of a hook determine the size and type of objects that can be grappled. For example, a hook having a shallow throat (a short bend) may have difficulty securely attaching around an object, but it may be easy to insert into a small hole through a flat surface. On the other hand, a hook having a deep throat (a long bend) may easily attach around an object, but it may be difficult or impossible to insert into a small hole through a flat surface.

Some standard "S" and "C" hooks have deep throats, and are therefore not suitable for all applications. Consequently, some tie downs have hooks that are specially shaped for certain applications. Alternatively, some tie downs have a generic fitting attached to the cord so any hook with a complementary fitting can be connected thereto. See, e.g., U.S. Pat. Nos. 8,069,539; 8,099,838; US 2009/0119891.

Sometimes the hooks of tie downs may tangle with each other and with the cords when stored together in a bin. To help prevent this, some tie-down designs permit the hooks to interlock or nest together for tangle-free storage. See, e.g., U.S. Pat. No. 9,249,825.

Some S and C hooks, as well as snap hooks and carabiners, do not provide an adequate grip for a user to hold onto when pulling the hook. A tie down that recoils when a user loses his grip may cause injury. Additionally, a user's finger may be pinched between a hook and an object during use. Consequently, some hook designs have a pull tab on the shank that can be gripped with a finger. See, e.g., U.S. Pat. Nos. 4,380,101; 5,317,788; 6,938,306; US 2013/0232733.

Finally, a notable limitation of some standard S and C hooks is that they may detach from an object due to slack in the cord, shifting of cargo, or vibrations. Carabiners and snap hooks address this limitation by providing a pivoting or sliding gate that creates an enclosed loop. The gate of such a carabiner or snap hook may pivot within the plane of the hook inwardly or outwardly; the gate may pivot above or below the plane of the hook; or the gate may slide or translate. The gate may be biased by a spring, magnet, flexible member, and so on. See, e.g., U.S. Pat. No. 827,206. The gate may be short and straight or it may be long and bent, sometimes resembling a second hook. For example, some clasps comprise two parallel hooks that face each other and pivot about a common joint. See, e.g., U.S. Pat. Nos. 222,324; 294,449; 397,136; 656,923; 712,959; 878,274; 955,070; 1,262,974; 1,512,914; 2,128,804; 2,795,024; 3,002,242; 3,128,520; 3,638,283; 5,050,273; 6,202,267; 6,460,225; 9,333,895; US 2004/0134118. Some of these clasps include a stop or lock mechanism to prevent the hooks from pivoting beyond a certain angle relative to each other, for example to prevent the hooks from opening too widely. See, e.g., U.S. Pat. Nos. 682,684; 2,874,435; 3,956,804; 5,956,980; US 2018/0187712. Some of these clasps include a means to bias or retain the hooks into certain positions relative to each other, for example to hold the clasp opened or closed via a spring, a ball roller, a locking ring, or a protrusion on one hook that engages with a depression on the other hook. See, e.g., U.S. Pat. Nos. 878,274; 931,588; 1,262,974; 1,584,307; 1,686,424; 2,731,695; 2,761,190; 3,072,987; 3,422,964; 3,956,804; 10,731,698; US 2018/0187712; EP 2,347,668; DE 3,336,115.

Four issues of hook devices have been described above: (1) hooks that have too deep or too shallow throats for an application; (2) hooks that readily tangle with cords and other hooks; (3) hooks that lack adequate grip for a user; and (4) hooks that accidentally detach from an object. This disclosure teaches an improved hook, hook assembly, and tie-down that address one or more of these issues.

BRIEF SUMMARY OF THE INVENTION

This disclosure teaches a versatile hook assembly, or clasp, that may be used by itself or in cooperation with a rope, cord, webbing, shock cord, elastic strap, or chain to tie, strap, bundle, or secure objects. The hook assembly comprises two parallel hooks that face, or oppose, each other. Each hook may pivot, or rotate, independently about a common pivot joint. By such pivoting, the hooks may be positioned at various angles with respect to each other to bring about various hook-assembly configurations, including "opened," "intermediate," "closed," and "crossed" configurations that are discussed in the detailed description below.

The hook assembly may include at least one pair of complementary retaining elements, or retainers, that aid in retaining, or latching, the hooks in a particular configuration. A first retainer of a pair may be defined on a first hook and a complementary second retainer of the pair may be defined on a second hook. For example, a retainer pair may comprise a protrusion on the first hook and a complementary depression on the second hook. When the retainers engage, the hooks experience a retentive resistance to rotate relative to each other. This retentive resistance occurs in the intermediate, closed, and crossed configurations discussed in the detailed description below. When no retainers are engaged, the hooks may rotate freely relative to each other. This occurs in the opened configuration discussed in the detailed description below. Retainers may be referred to as detentes, snaps, receivers, acceptors, registers, embossments, bumps, protrusions, peaks, ridges, dents, dimples, troughs, grooves, depressions, notches, edges, kinks, corrugations, bends, deformities, edges, and so on.

A retainer may be biased by a spring acting parallel and/or perpendicular to the plane of rotation of the hooks. Retainers may have various retention resistance. A user may overcome the retention resistance by applying sufficient and lateral or medial force to one or both hooks, i.e., forcing the hooks towards or away from each other within the plane of rotation of the hooks.

BRIEF DESCRIPTION OF THE DRAWINGS

FIG. 1A shows a perspective view of a typical C hook and FIG. 1B shows a perspective view of a typical S hook.

FIG. 2 shows a perspective view of an embodiment annotated with directional terminology used in this disclosure.

FIGS. 3A-3B show perspective views of an embodiment of the hook assembly with a cord attached or coupled thereto.

DETAILED DESCRIPTION OF THE INVENTION

Figure 4A:
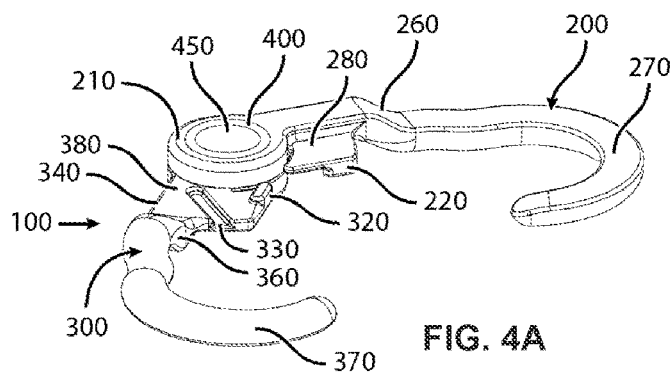
FIGS. 4A-4C show upper perspective views of an embodiment in opened, closed, and crossed configurations, respectively.
Figure 4B:
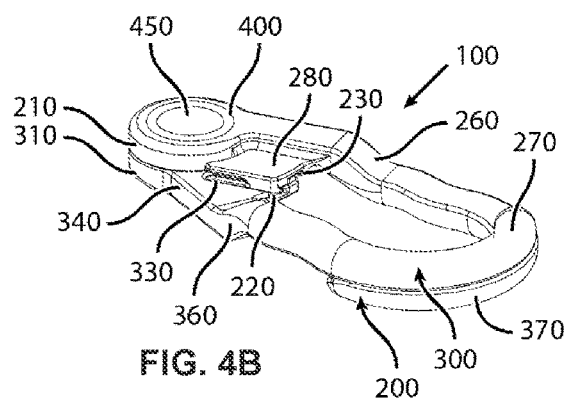
Figure 4C:
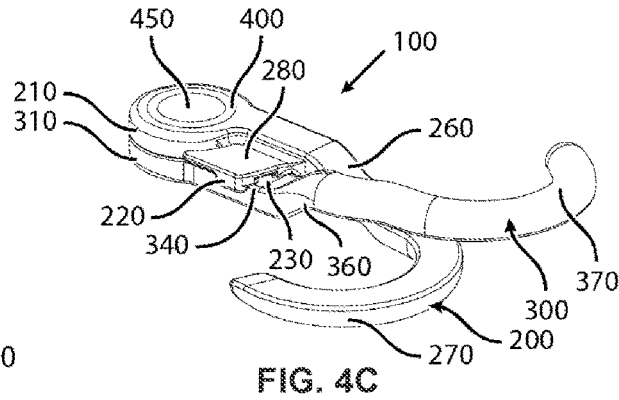
Figure 4D:
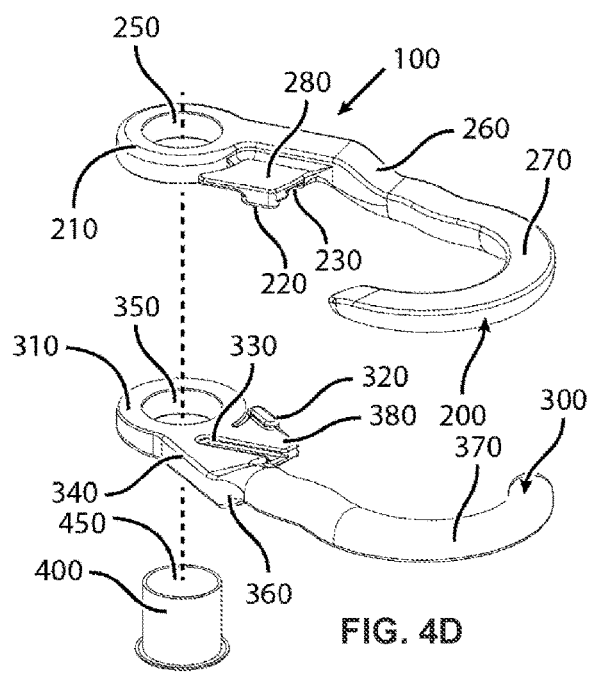
FIG. 4D shows an upper perspective view prior to assembly.
Figure 5A:
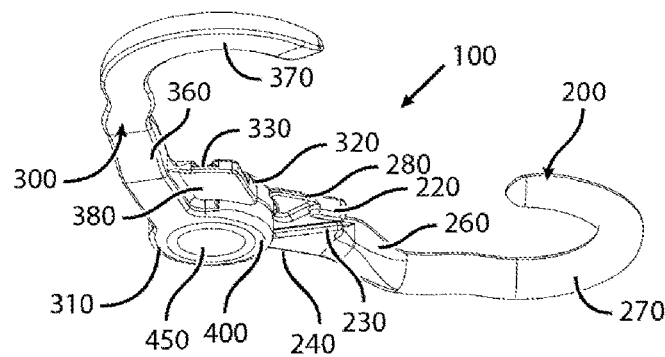
FIGS. 5A-5C show lower perspective views of an embodiment in opened, closed, and crossed configurations, respectively.
Figure 5B:
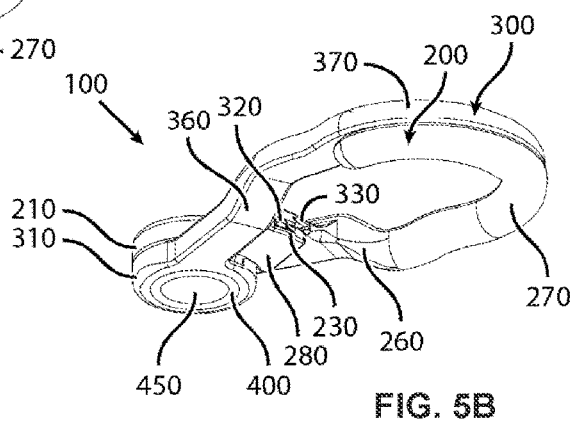
Figure 5C:
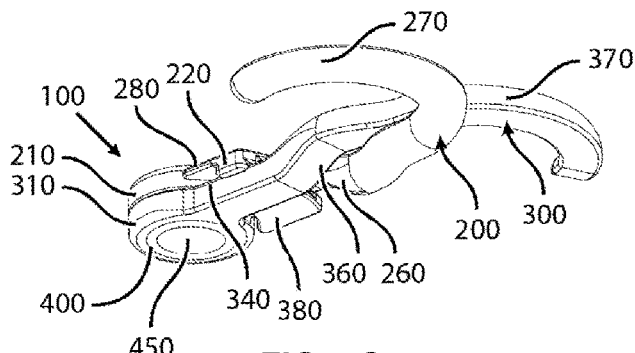
Figure 5D:
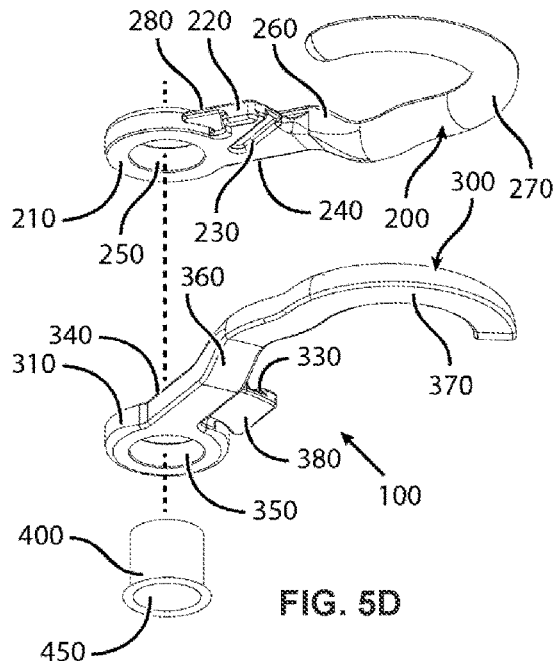
FIG. 5D shows a lower perspective view prior to assembly.
Figure 6A:
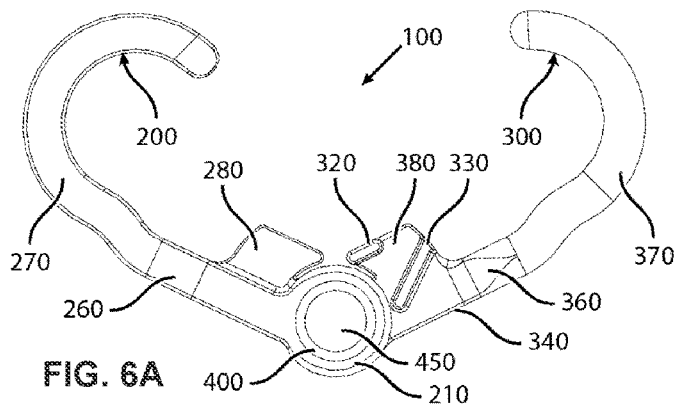
FIGS. 6A-6B show top views of an embodiment in opened and crossed configurations, respectively.
Figure 6B:
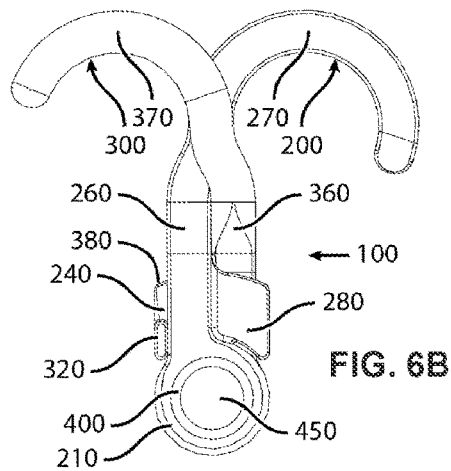
Figure 7A:
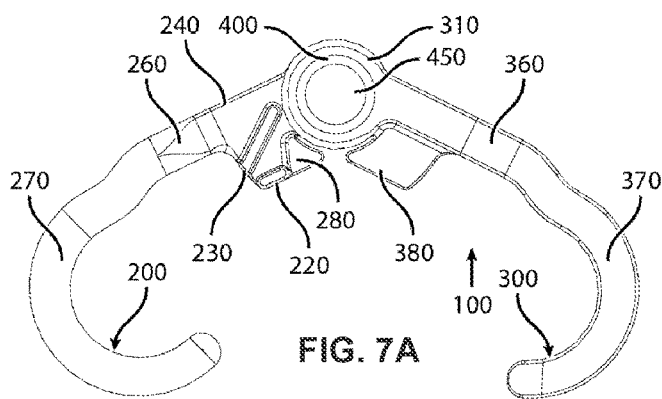
FIGS. 7A-7B show bottom views of an embodiment in opened and crossed configurations, respectively.
Figure 7B:
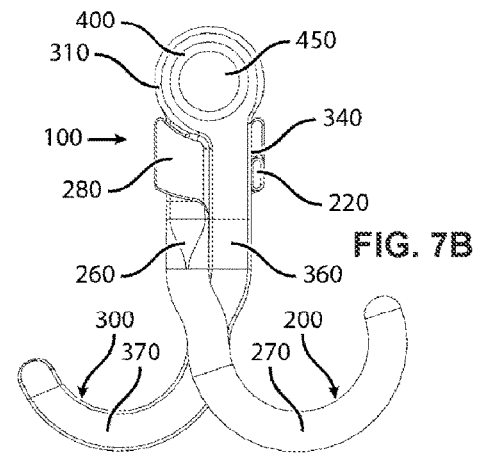
Figure 8A:
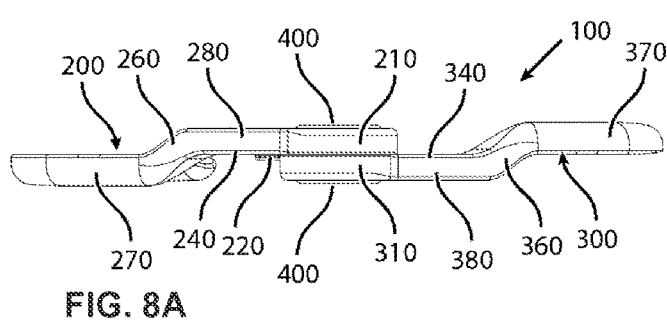
FIGS. 8A-8B show back elevation views of an embodiment in opened and crossed configurations, respectively.
Figure 8B:
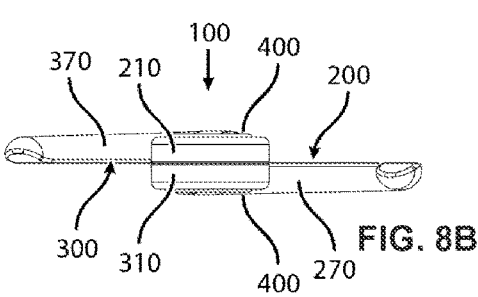
Figure 9A:
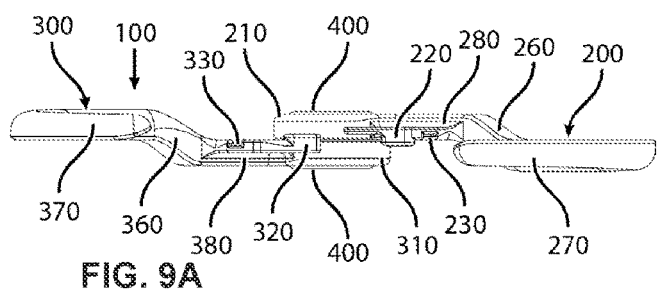
FIGS. 9A-9B show front elevation views of an embodiment in opened and crossed configurations, respectively.
Figure 9B:
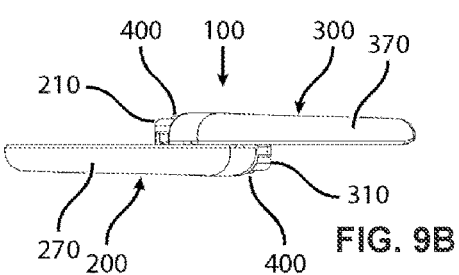

The following numerals are used to identify the corresponding elements in the figures for the several embodiments.

100 hook assembly
200 deep hook
210 sleeve
220 protrusion
230 depression
230x protrusion
240 lateral edge
250 hole
260 planar crossover
270 bend
280 shank
300 shallow hook
310 sleeve
320 protrusion
320x depression
330 depression
340 lateral edge
350 hole
360 planar crossover
370 bend
380 shank
400 bushing
410 tube
420 flange
430 groove
440 snap ring
450 hole
460 recess
470 plug
480 flange
490 recess
500 cord FIG. 1A shows a typical C hook and FIG. 1B shows a typical S hook with various parts of each hook labeled as they may be used in this disclosure. A shank is generally the part of a hook between a grappling end and a cord-attachment end. The shank may be straight or curved and it may have any cross-sectional shape. A bend is the typically curved portion of a hook used for grappling or surrounding an object. A bend extends from the shank to a tip of the hook. A hook may or may not include a front length between the bend and the tip. The opening is approximately the distance between the shank and the tip, while the gape is the distance between the base of the bend and the tip. The throat is approximately the distance between a midpoint of the bend and a midpoint of a line projected from the base of the bend to the tip, where a deep throat corresponds to a large distance and a shallow throat corresponds to a small distance. In this disclosure, the terms "hook" and "jaw" may be used interchangeably to describe a rigid member having a shank, a bend, a throat, and a gape.

FIG. 2 shows directional terminology that may be used in this disclosure. The term "back" indicates adjacency to a region where a cord may be attached or coupled, and the term "front" indicates adjacency to a bend or a tip. The term "medial" indicates adjacency to or towards a midline between the hooks (the x-axis), and the term "lateral" indicates distant from or away from that midline. The x-y plane may be referred to as the plane of rotation of the hooks, even though portions each hook are disposed in respective parallel planes. The z-axis indicates deviation from the plane of rotation.

FIGS. 3A-3B show an embodiment of the hook assembly 100 comprising a deep hook 200 and an opposing shallow hook 300, each coupled to a bushing 400 which forms a pivot joint. A cord 500 may be inserted through a hole 450 in the bushing 400, or the cord 500 may be attached or moveably coupled to the hook assembly 100. In FIGS. 3A-3B, the hook assembly 100 is shown in the closed configuration. Despite the "deep" and "shallow" labels used to describe the hooks of the several embodiments, the hooks may have throats of equal or unequal depths; they may have bends of equal or unequal lengths; they may have gapes of equal or unequal sizes; and they may have shanks of equal or unequal lengths.

FIGS. 4A-10D and FIGS. 18A-19B show embodiments where the deep hook 200 and shallow hook 300 may be formed from plastic, and FIGS. 11A-17D show an embodiment where the deep hook 200 and shallow hook 300 may be formed from metal. The hook assembly 100 comprises a deep hook 200 and a shallow hook 300 coupled to each other by a pivot joint. In some embodiments, the pivot joint may comprise a bushing 400. The pivot joint enables the deep hook 200 and the shallow hook 300 to rotate relative to each other within a plane of rotation (or more generally in parallel planes of rotation). This planar rotation gives rise to several configurations of the hook assembly 100.

FIGS. 4A, 5A, 6A, 7A, 8A, 9A, 10A, 11A, 12A, 13A, 14A, 15A, 16A, and 17A show the hook assembly 100 in an "opened" configuration. Here, the deep hook 200 and the shallow hook 300 may rotate freely towards each other and away from each other about the bushing 400.

Figure 10A:
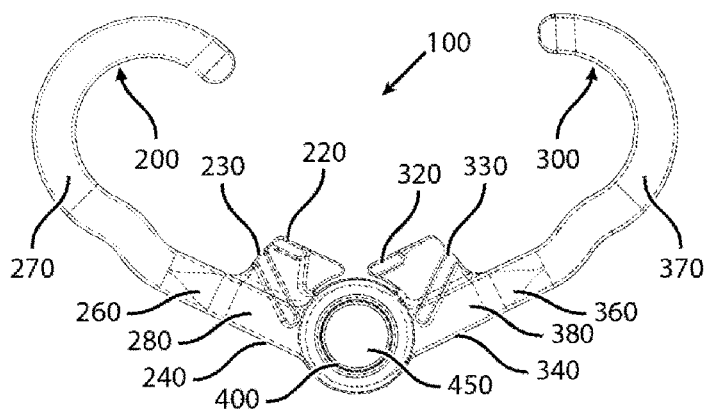
FIGS. 10A-10D show transparent top perspective views of an embodiment in opened, intermediate, closed, and crossed configurations, respectively.
Figure 10B:
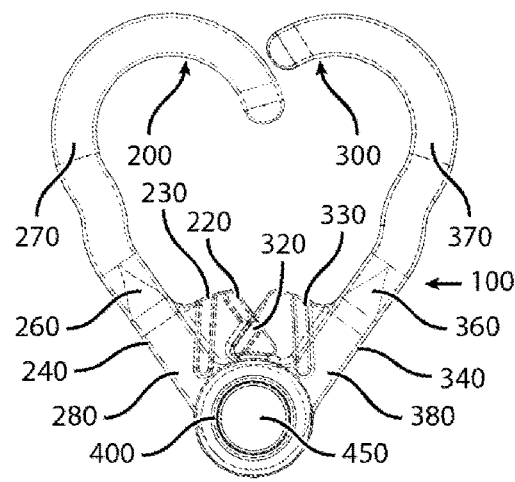
Figure 10C:
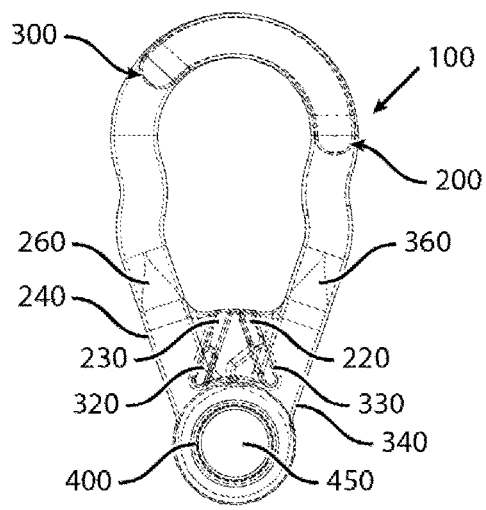
Figure 10D:
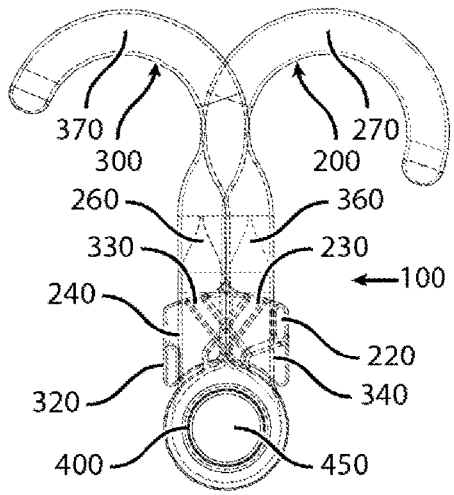
Figure 11A:
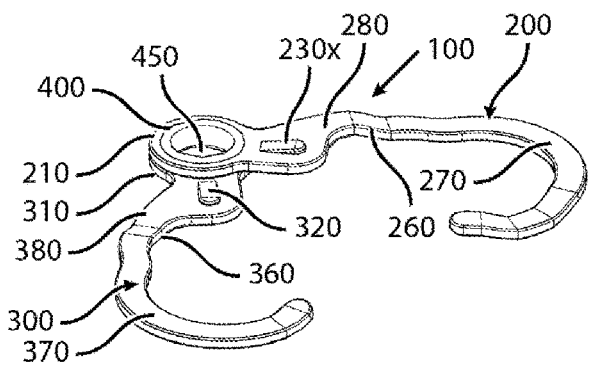
FIGS. 11A-11C show upper perspective views of an embodiment in opened, closed, and crossed configurations, respectively.
Figure 11B:
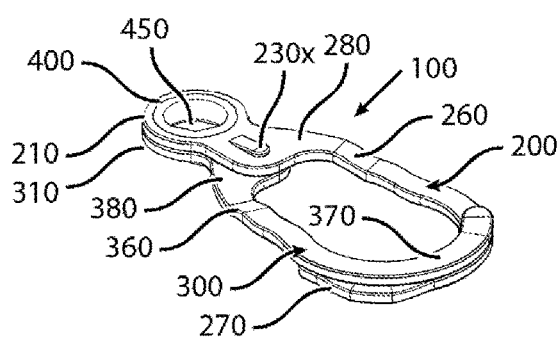
Figure 11C:
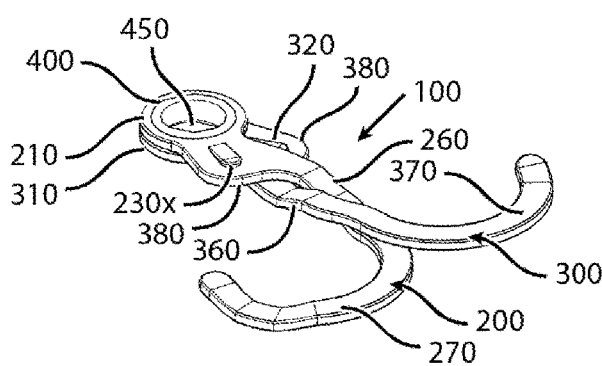
Figure 11D:
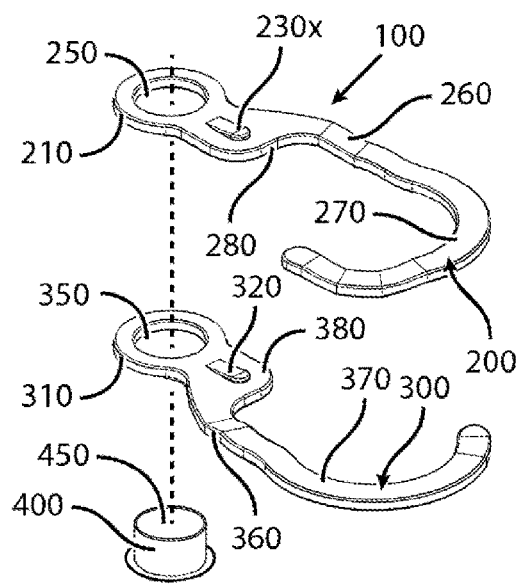
FIG. 11D shows an upper perspective view prior to assembly.
Figure 12A:
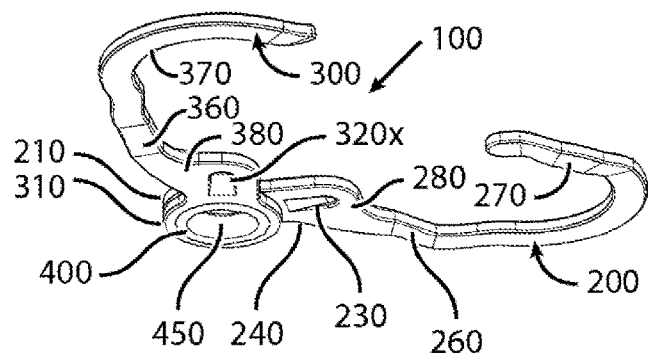
FIGS. 12A-12C show lower perspective views of an embodiment in opened, closed, and crossed configurations, respectively.
Figure 12B:
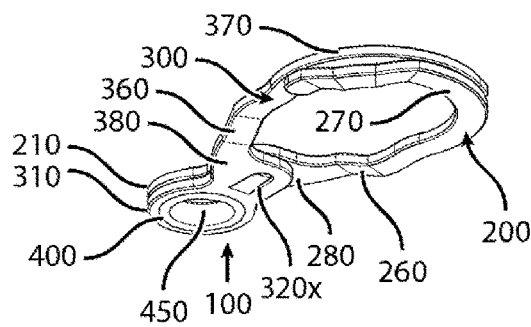
Figure 12C:
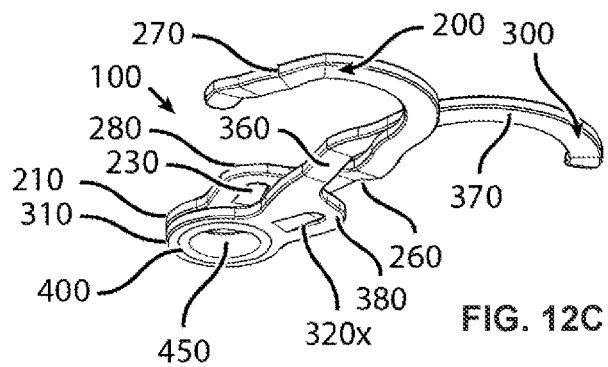
Figure 12D:
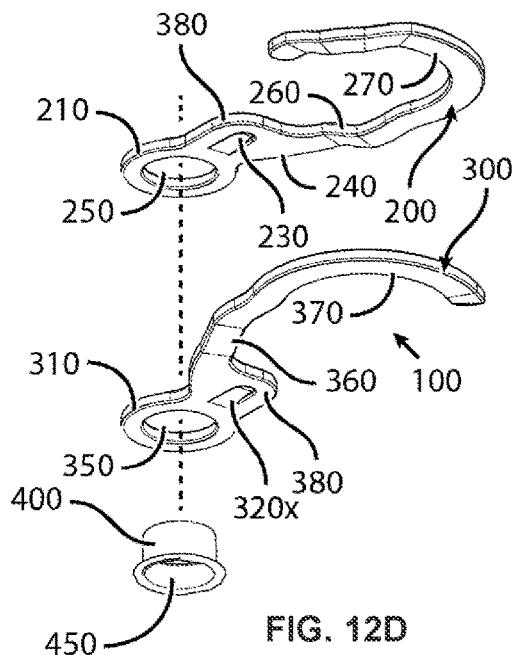
FIG. 12D shows a lower perspective view prior to assembly.
Figure 13A:
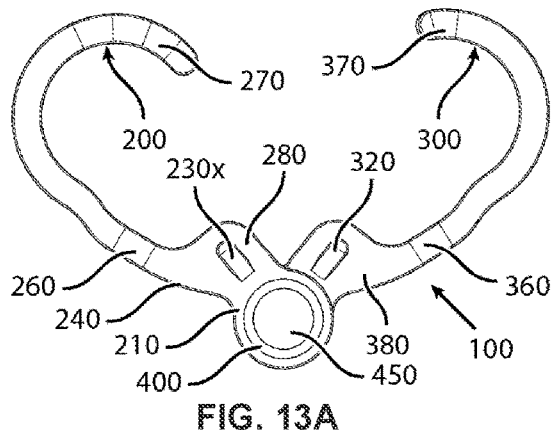
FIGS. 13A-13B show top views of an embodiment in opened and crossed configurations, respectively.
Figure 13B:
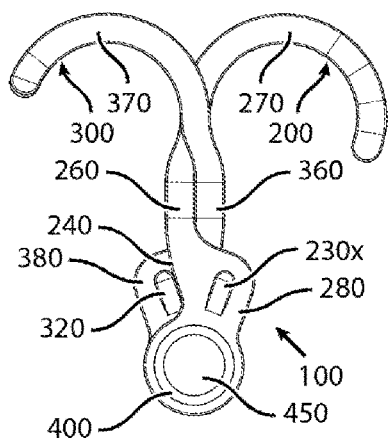
Figure 14A:
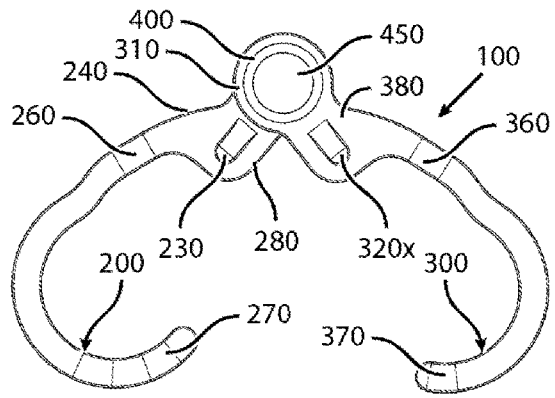
FIGS. 14A-14B show bottom views of an embodiment in opened and crossed configurations, respectively.
Figure 14B:
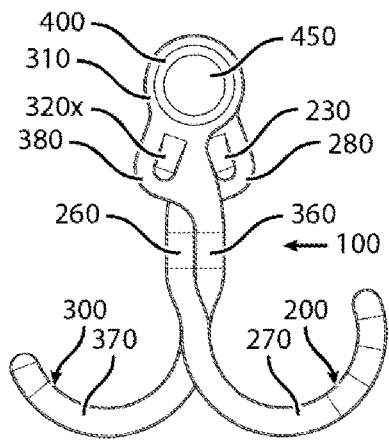
Figure 15A:
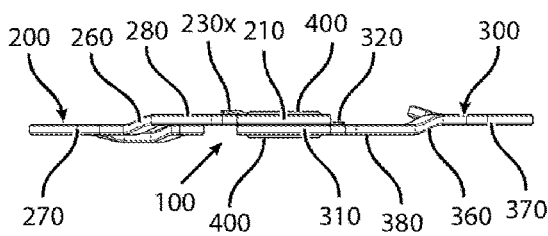
FIGS. 15A-15B show back elevation views of an embodiment in opened and crossed configurations, respectively.
Figure 15B:
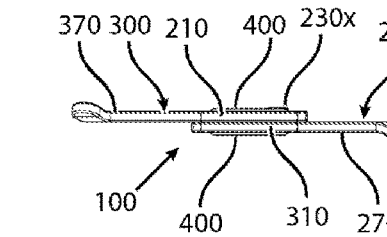
Figure 16A:
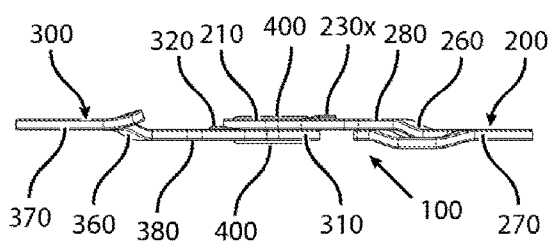
FIGS. 16A-16B show front elevation views of an embodiment in opened and crossed configurations, respectively.
Figure 16B:
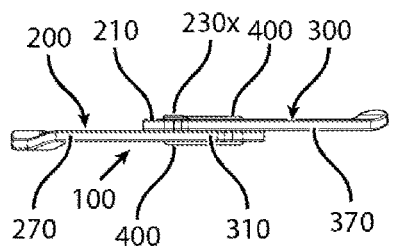
Figure 17A:
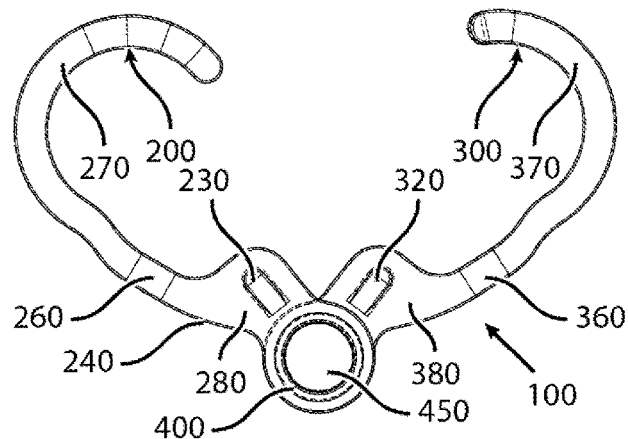
FIGS. 17A-17D show transparent top perspective views of an embodiment in opened, intermediate, closed, and crossed configurations, respectively.
Figure 17B:
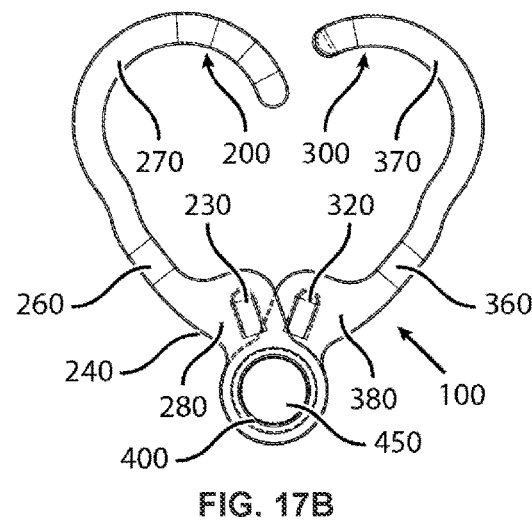
Figure 17C:
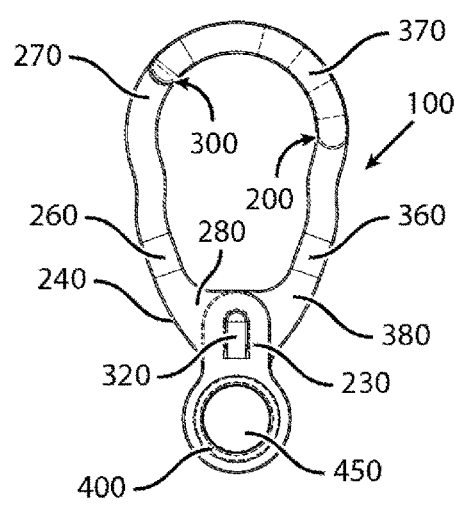
Figure 17D:
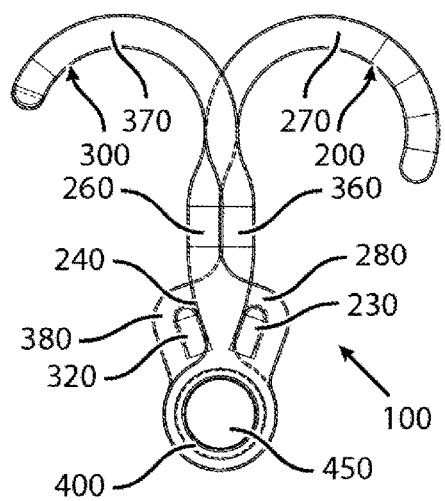

FIGS. 10B and 17B show the hook assembly 100 in an "intermediate" configuration. Here, the deep hook 200 and the shallow hook 300 may rotate freely away from each other, but they experience retentive resistance when rotating further towards each other.

FIGS. 4B, 5B, 10C, 11B, 12B, and 17C show the hook assembly 100 in a "closed" configuration, where the bend 270 and the bend 370 substantially overlap each other. Here, the deep hook 200 and the shallow hook 300 may experience retentive resistance when rotating medially towards each other and laterally away from each other.

FIGS. 4C, 5C, 6B, 7B, 8B, 9B, 10D, 11C, 12C, 13C, 14B, 15B, 16D, and 17D show the hook assembly 100 in a "crossed" configuration, where the bend 270 and the bend 370 have pivoted substantially past each other and a base of the bend 270 abuts a base of the bend 370. Here, the deep hook 200 and shallow hook 300 are stopped from rotating further towards each other, and they may experience retentive resistance when rotating away from each other.

FIGS. 4D, 5D, 11D, and 12D show exploded pre-assembled views of the hook assembly 100, where the pivot joint comprises a bushing 400 disposed within a hole 250 defined by a sleeve 210 of the deep hook 200 and within a hole 350 defined by a sleeve 310 of the shallow hook 300. In these embodiments, the bushing 400 has a hole 450 therethrough, but in other embodiments the bushing 400 may be a solid element or it may have partial bores therein. The bushing 400 may be referred to as a hollow rivet, hollow post, bearing, axle, grommet, eyelet, pin, rivet, post, bearing, axle, or annular coupling. The bushing 400 may consist of a single component or it may comprise multiple components that couple together. In FIGS. 4D, 5D, 11D, and 12D, the bushing 400 has a flange on only one end, so that a flange on the opposite end may be formed during manufacturing assembly after insertion of the bushing 400 into the hole 250 and hole 350. The pivot joint may be achieved without the use of a discrete bushing component, for example as shown in the cross-sectional views of FIGS. 18A-21C.

Figure 18A:
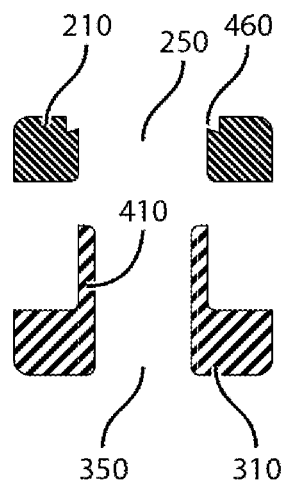
FIGS. 18A-18C show cross-sectional views of an embodiment where heat-staking is used in forming the pivot joint.
Figure 18B:
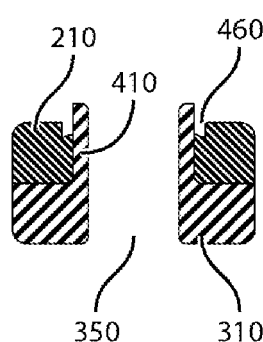
Figure 18C:
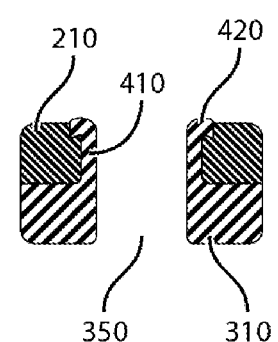

FIGS. 18A-18C show an embodiment where the pivot joint comprises an annular flange 420 formed by staking, punching, pressing, flaring, swaging, and so on (hereafter referred to generally as staking). Exemplary staking processes include heat or thermal staking, infrared staking, ultrasonic staking, cold punching, and so on. In this disclosure, the term "annular" means partly or wholly circumferential. FIG. 18A shows a tube 410 extending from a sleeve 310 before assembly. FIG. 18B shows the tube 410 disposed within a hole 250 of a sleeve 210 during assembly. FIG. 18C shows an annular flange 420 at a distal end of the tube 410, formed after assembly by any suitable staking process. The flange 420 rests in an optional annular recess 460 circumscribing the hole 250 (as shown) and/or on an upper surface of the sleeve 210 (not shown).

Figure 19A:
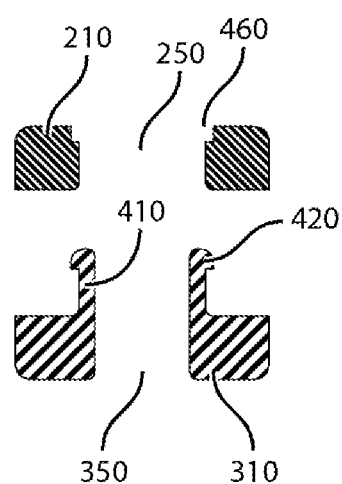
FIGS. 19A-19B show cross-sectional views of an embodiment where press-fitting is used in forming the pivot joint.
Figure 19B:
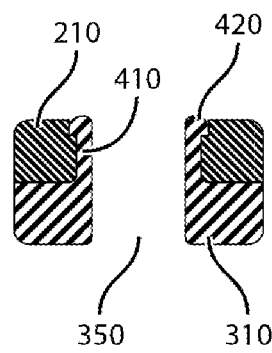

FIGS. 19A-19B show an embodiment where the pivot joint comprises a press-fit annular flange 420. FIG. 19A shows a tube 410 extending from a sleeve 310 before assembly, where the flange 420 is defined at a distal end of the tube 410. FIG. 19B shows the tube 410 disposed within a hole 250 of a sleeve 210 after assembly, where the flange 420 snap-fits into an optional recess 460 in the hole 250 (as shown) and/or onto an upper surface of the sleeve 210 (not shown).

Figure 20A:
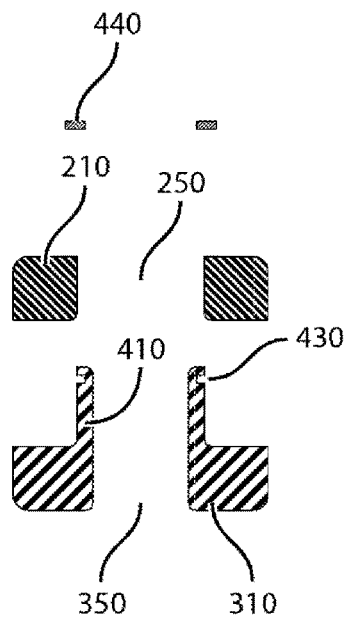
FIGS. 20A-20C show cross-sectional views of an embodiment where a retaining clip is used in forming the pivot joint.
Figure 20B:
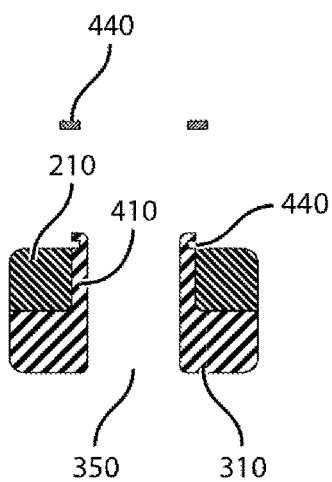
Figure 20C:
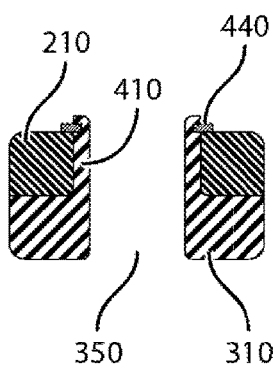

FIGS. 20A-20C show an embodiment where the pivot joint comprises a snap ring 440. The snap ring 420 may be referred to as a retaining ring, C-ring, C-clip, circlip, and so on. FIG. 20A shows a tube 410 extending from a sleeve 310 before assembly, where an annular groove 430 is defined at a distal end of the tube 410. FIG. 20B shows the tube 410 disposed within a hole 250 of a sleeve 210 during assembly. FIG. 20C shows the snap ring 440 engaged to the groove 430 after assembly.

Figure 21A:
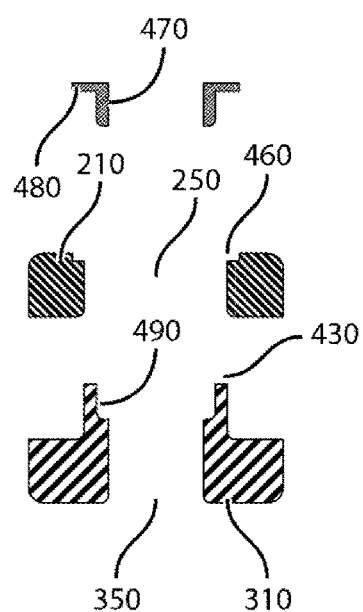
FIGS. 21A-21C show cross-sectional views of an embodiment where a plug is used in forming the pivot joint.
Figure 21B:
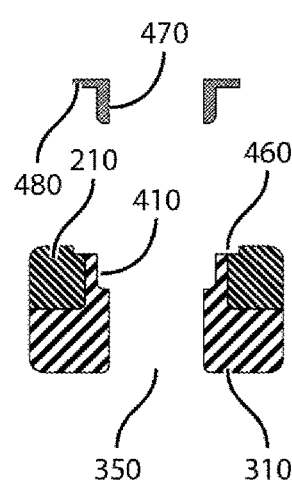
Figure 21C:
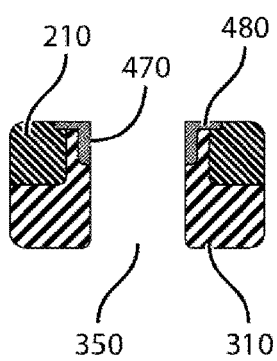

FIGS. 21A-21C show an embodiment where the pivot joint comprises a plug 470 having an annular flange 480. The plug 470 may be referred to as a button, cap, cover, rivet, and so on, and the plug 470 may be hollow or solid. FIG. 21A shows a tube 410 extending from a sleeve 310 before assembly, where an optional annular recess 490 may be defined at a distal end of the tube 410 for receiving the plug 470. FIG. 21B shows the tube 410 disposed within a hole 250 of a sleeve 210 during assembly. FIG. 21C shows the plug 470 disposed within the tube 410 after assembly, where the flange 480 rests in an optional recess 460 in the hole 250 (as shown) and/or on an upper surface of the sleeve 210 (not shown). The plug 470 may be secured to the tube 410 by any suitable means, for example press-fitting, snap-fitting, gluing, thermal welding, infrared welding, ultrasonic welding, and so on.

As shown in FIGS. 4A-17D, the sleeve 210 and the shank 280 of the deep hook 200 are disposed above the plane of rotation while the bend 270 of the deep hook 200 is disposed below the plane of rotation (see FIG. 2 for directional nomenclature). The transition from above this plane to below this plane is achieved by a planar crossover 260. Similarly, the sleeve 310 and the shank 380 of the shallow hook 300 are disposed below the plane of rotation while the bend 370 of the shallow hook 300 is disposed above the plane of rotation. The transition from below this plane to above this plane is achieved by a planar crossover 360. The planar crossover 260 and the planar crossover 360 play an important role in ensuring that complementary retainers defined on the deep hook 200 and the shallow hook 300 adequately engage with each other and provide consistent levels of retentive resistance, as discussed below with respect to the several embodiments.

The following discussion relates to the embodiment shown in FIGS. 4A-10D. A protrusion 220 extends downward from the shank 280 of the deep hook 200, which engages with a complementary depression 330 in the shank 380 of the shallow hook 300 when the hook assembly 100 is in the closed configuration as shown by FIGS. 4B, 5B, and 10C. Similarly, a protrusion 320 extends upward from the shank 380 of the shallow hook 300, which engages with a complementary depression 230 in the shank 280 of the deep hook 200 when the hook assembly 100 is in the closed configuration as shown by FIGS. 4B, 5B, and 10C. Through engagement of these complementary retainers (protrusion 220, depression 330, protrusion 320, and depression 230), the deep hook 200 and the shallow hook 300 experience a retentive resistance to rotate relative to each other.

Because the shank 280 is above the plane of rotation while the bend 270 is below the plane of rotation, and further because the shank 380 is below the plane of rotation while the bend 370 is above the plane of rotation, any deviation of either bend 270 or bend 370 away from the plane of rotation (in the z-direction away from each other) causes the complementary retainers to press against each other rather than to separate. Thus, because of the planar crossover 260 and the planar crossover 360, the complementary retainers will remain engaged regardless of deviations of the bend 270 and/or the bend 370 away from the plane of rotation, which may be common during use.

Upon application of sufficient lateral force to either the deep hook 200 or the shallow hook 300 when the hook assembly is in the closed position, the protrusion 220 may be forced to disengage with the depression 330, and the protrusion 320 may be forced to disengage with the depression 230, thereby permitting relative rotation of the deep hook 200 laterally away from the shallow hook 300. This may cause the hook assembly 100 into the opened configuration as shown in FIGS. 4A, 5A, 6A, 7A, 8A, 9A, and 10A. In the opened configuration, no complementary retainers are engaged with each other, such that the deep hook 200 and the shallow hook 300 may rotate freely relative to each other without retentive resistance.

Upon application of sufficient medial force to either the deep hook 200 or the shallow hook 300 when the hook assembly is in the closed position, the protrusion 220 may be forced to disengage with the depression 330, and the protrusion 320 may be forced to disengage with the depression 230, thereby permitting relative rotation of the deep hook 200 medially towards the shallow hook 300. This may cause the hook assembly 100 into the crossed configuration as shown in FIGS. 4C, 5C, 6B, 7B, 8B, 9B, and 10D. In the crossed configuration, the protrusion 220 of the shank 280 is engaged with a complementary lateral edge 340 of the shank 380. Also, in the crossed configuration, the protrusion 320 of the shank 380 is engaged with a complementary lateral edge 240 of the shank 280. Through engagement of these complementary retainers, the deep hook 200 and the shallow hook 300 experience a retentive resistance to rotate laterally away from each other. In the crossed configuration, the base of the bend 270 is adjacent to a base of the bend 370 and medial surfaces of the hooks abut each other, thereby preventing further rotation of the hooks medially towards or past each other.

The following discussion relates to the embodiment shown in FIGS. 11A-17D. A protrusion 320 extends upward from the shank 380 of the shallow hook 300, which engages with a complementary depression 230 in the shank 280 of the deep hook 200 when the hook assembly 100 is in the closed configuration as shown by FIGS. 11B, 12B, and 17C. Through engagement of these complementary retainers (protrusion 320 and depression 230), the deep hook 200 and the shallow hook 300 experience a retentive resistance to rotate relative to each other. In an exemplary metal-stamping manufacturing process, a protrusion 230x may be defined on a face of the shank 280 opposite the depression 230 as a consequence of stamping the depression 230. Similarly, a depression 330x may be defined on a face of the shank 380 opposite the protrusion 320 as a consequence of stamping the protrusion 320.

Because the shank 280 is above the plane of rotation while the bend 270 is below the plane of rotation, and further because the shank 380 is below the plane of rotation while the bend 370 is above the plane of rotation, any deviation of either bend 270 or bend 370 away from the plane of rotation (in the z-direction away from each other) causes the complementary retainers to press against each other rather than to separate. Thus, because of the planar crossover 260 and the planar crossover 360, the complementary retainers will remain engaged regardless of deviations of the bend 270 and the bend 370 away from the plane of rotation, which may be common during use.

Upon application of sufficient lateral force to either the deep hook 200 or the shallow hook 300 when the hook assembly is in the closed position, the depression 230 may be forced to disengage with the protrusion 320, thereby permitting relative rotation of the deep hook 200 laterally away from the shallow hook 300. This may cause the hook assembly 100 into the opened configuration as shown in FIGS. 11A, 12A, 13A, 14A, 15A, 16A, and 17A. In the opened configuration, no complementary retainers are engaged with each other, such that the deep hook 200 and the shallow hook 300 may rotate freely relative to each other without retentive resistance.

Upon application of sufficient medial force to either the deep hook 200 or the shallow hook 300 when the hook assembly is in the closed position, the depression 230 may be forced to disengage with the protrusion 320, thereby permitting relative rotation of the deep hook 200 medially towards the shallow hook 300. This may cause the hook assembly 100 into the crossed configuration as shown in FIGS. 11C, 12C, 13C, 14B, 15B, 16D, and 17D. In this configuration, the protrusion 320 of the shank 380 is engaged with a complementary lateral edge 240 of the shank 280. Through engagement of these complementary retainers, the deep hook 200 and the shallow hook 300 experience a retentive resistance to rotate laterally away from each other. In the crossed configuration, the base of the bend 270 is adjacent to a base of the bend 370 and medial faces of the hooks abut each other, thereby preventing further rotation of the hooks medially towards or past each other.

The foregoing embodiments are exemplary and should not be interpreted as limiting the scope of the present invention. Various implementations and combinations of these embodiments have been recognized and anticipated. It is therefore intended that the appended claims cover all such embodiments that do not depart from the spirit and scope of the present invention.

What is claimed is:

1. A clasp comprising:
 a pivot joint having an axis perpendicular to a plane;
 a first hook comprising:
  a first sleeve, disposed below the plane, coupled to the pivot joint,
  a first shank, disposed below the plane, defining a first upward protrusion, and
  a first bend disposed above the plane;
 a second hook comprising:
  a second sleeve, disposed above the plane, coupled to the pivot joint,
  a second shank, disposed above the plane, defining a second upward depression and a second lateral edge, and
  a second bend, disposed below the plane, facing opposite the first bend;
 wherein:
  the first upward protrusion engages with the second upward depression when the first bend substantially overlaps the second bend; and
  the first upward protrusion engages with the second lateral edge when a base of the first bend abuts a base of the second bend.

2. The clasp of claim 1 wherein the pivot joint comprises a bushing disposed within the first sleeve and the second sleeve.

3. The clasp of claim 1 wherein the pivot joint comprises a tube extending from the first sleeve and disposed within the second sleeve.

4. The clasp of claim 3 wherein the tube comprises a distal annular flange adapted to engage with the second sleeve.

5. The clasp of claim 3 wherein the tube comprises a distal annular groove adapted to receive a retaining ring adapted to engage with the second sleeve.

6. The clasp of claim 3 wherein the tube is adapted to receive a plug having an annular flange adapted to engage with the second sleeve.

7. The clasp of claim 1 wherein:
the first shank defines a first downward depression and a first lateral edge; and
the second shank defines a second downward protrusion;
wherein:
the second downward protrusion engages with the first downward depression when the first bend substantially overlaps the second bend; and
the second downward protrusion engages with the first lateral edge when the base of the first bend abuts the base of the second bend.

8. The clasp of claim 7 wherein the pivot joint comprises a bushing disposed within the first sleeve and the second sleeve.

9. The clasp of claim 7 wherein the pivot joint comprises a tube extending from the first sleeve and disposed within the second sleeve.

10. The clasp of claim 9 wherein the tube comprises a distal annular flange adapted to engage with the second sleeve.

11. The clasp of claim 9 wherein the tube comprises a distal annular groove adapted to receive a retaining ring adapted to engage with the second sleeve.

12. The clasp of claim 9 wherein the tube is adapted to receive a plug having an annular flange adapted to engage with the second sleeve.

13. A clasp comprising:
a pivot joint having an axis perpendicular to a plane;
a first hook comprising:
a first sleeve, disposed below the plane, coupled to the pivot joint,
a first shank, disposed below the plane, defining a first upward protrusion, a first downward depression, and a first lateral edge, and
a first bend disposed above the plane; and
a second hook comprising:
a second sleeve, disposed above the plane, coupled to the pivot joint,
a second shank, disposed above the plane, defining a second upward depression, a second downward protrusion, and a second lateral edge, and
a second bend, disposed below the plane, facing opposite the first bend;
wherein:
the first upward protrusion engages with the second upward depression, and the second downward protrusion engages with the first downward depression, when the first bend substantially overlaps the second bend; and
the first upward protrusion engages with the second lateral edge, and the second downward protrusion engages with the first lateral edge, when a base of the first bend abuts a base of the second bend.

14. The clasp of claim 13 wherein the pivot joint comprises a bushing disposed within the first sleeve and the second sleeve.

15. The clasp of claim 13 wherein the pivot joint comprises a tube extending from the first sleeve and disposed within the second sleeve.

16. The clasp of claim 15 wherein the tube comprises a distal annular flange adapted to engage with the second sleeve.

17. The clasp of claim 15 wherein the tube comprises a distal annular groove adapted to receive a retaining ring adapted to engage with the second sleeve.

18. The clasp of claim 15 wherein the tube is adapted to receive a plug having an annular flange adapted to engage with the second sleeve.

19. A clasp comprising:
a first hook comprising;
a first sleeve, disposed below a plane, defining a tube extending upward perpendicular to the plane,
a first shank, disposed below the plane, defining a first upward protrusion, a first downward depression, and a first lateral edge, and
a first bend disposed above the plane; and
a second hook comprising:
a second sleeve, disposed above the plane, defining a hole adapted to receive the tube,
a second shank, disposed above the plane, defining a second upward depression, a second downward protrusion, and a second lateral edge, and
a second bend, disposed below the plane, facing opposite the first bend;
wherein;
the first upward protrusion engages with the second upward depression, and the second downward protrusion engages with the first downward depression, when the first bend substantially overlaps the second bend; and
the first upward protrusion engages with the second lateral edge, and the second downward protrusion engages with the first lateral edge, when a base of the first bend abuts a base of the second bend.

20. The clasp of claim 19 wherein the tube comprises a distal annular flange adapted to engage with the second sleeve.

21. The clasp of claim 19 wherein the tube comprises a distal annular groove adapted to receive a retaining ring adapted to engage with the second sleeve.

22. The clasp of claim 19 wherein the tube is adapted to receive a plug having an annular flange adapted to engage with the second sleeve.

* * * * *